United States Patent
Worthen et al.

(10) Patent No.: US 10,118,558 B1
(45) Date of Patent: Nov. 6, 2018

(54) CARGO SECURING MECHANISM FOR A TRUNK DOOR OF A VEHICLE

(71) Applicant: Ford Global Technologies, LLC, Dearborn, MI (US)

(72) Inventors: Reid Worthen, Dearborn, MI (US); Victoria Leigh Schein, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 65 days.

(21) Appl. No.: 15/585,364

(22) Filed: May 3, 2017

(51) Int. Cl.
| | |
|---|---|
| *B62D 25/10* | (2006.01) |
| *B60R 5/00* | (2006.01) |
| *B60J 5/10* | (2006.01) |
| *B60R 5/04* | (2006.01) |
| *B60R 11/00* | (2006.01) |
| *E05F 3/20* | (2006.01) |
| *E05F 15/63* | (2015.01) |
| *E05F 15/619* | (2015.01) |
| *E05D 11/10* | (2006.01) |

(52) U.S. Cl.
CPC .............. *B60R 5/006* (2013.01); *B60J 5/101* (2013.01); *B60R 5/041* (2013.01); *B60R 11/00* (2013.01); *E05D 11/1028* (2013.01); *E05F 3/20* (2013.01); *E05F 15/619* (2015.01); *E05F 15/63* (2015.01); *B60R 2011/0036* (2013.01); *B60R 2011/0071* (2013.01); *B60R 2011/0085* (2013.01); *B60R 2011/0092* (2013.01); *E05Y 2900/548* (2013.01)

(58) Field of Classification Search
CPC ......... B60R 5/006; B60R 5/041; B60R 11/00; B60R 2011/0036; B60R 2011/0071; B60R 2011/0085; B60R 2011/0092; E05F 15/619; E05F 15/63; E05F 3/20; B60J 5/101; E05D 11/1028; E05Y 2900/548
See application file for complete search history.

(56) References Cited

U.S. PATENT DOCUMENTS

| | | | |
|---|---|---|---|
| 3,525,687 A | 8/1970 | Ross et al. | |
| 5,839,719 A | 11/1998 | Hosan et al. | |
| 7,147,266 B2 | 12/2006 | Huntsman et al. | |
| 8,215,691 B2 | 7/2012 | Ewing | |
| 9,318,922 B2 * | 4/2016 | Hall .......................... | B60L 1/00 |
| 9,470,034 B2 | 10/2016 | Ihlenburg et al. | |

(Continued)

FOREIGN PATENT DOCUMENTS

| | | |
|---|---|---|
| DE | 19747170 | 5/1999 |
| FR | 2818304 A1 | 6/2002 |

OTHER PUBLICATIONS

Stabilus, "Tailgate/Trunk," http://www.stabilus.com/applications/applications-in-automotive-manufacturing/body/tailgate-trunk/, Feb. 22, 2017, 1 page.

*Primary Examiner* — Lori L Lyjak
(74) *Attorney, Agent, or Firm* — Jason Rogers; Price Heneveld LLP

(57) ABSTRACT

A vehicle trunk door includes a door panel. A hinge is coupled to the door panel for rotating the door panel between a plurality of rotational positions. A motor is coupled to the hinge, wherein the motor applies a rotational force to the hinge, wherein the rotational force biases the door panel toward a closed position. When cargo is disposed within a trunk aperture, the door panel is biased against the cargo to at least partially secure the cargo within the trunk aperture.

20 Claims, 12 Drawing Sheets

(56) References Cited

U.S. PATENT DOCUMENTS

| | | | | |
|---|---|---|---|---|
| 2002/0010979 A1* | 1/2002 | Moll | ................... | E05F 1/02 |
| | | | | 16/255 |
| 2006/0082186 A1* | 4/2006 | Bals | ................ | E05F 15/614 |
| | | | | 296/146.1 |
| 2013/0221744 A1* | 8/2013 | Hall | .................. | H02J 17/00 |
| | | | | 307/9.1 |
| 2014/0265555 A1* | 9/2014 | Hall | .................. | B60L 1/00 |
| | | | | 307/9.1 |
| 2016/0221441 A1* | 8/2016 | Hall | .................. | B60L 1/00 |

* cited by examiner

CARGO SECURING MECHANISM FOR A TRUNK DOOR OF A VEHICLE

FIELD OF THE INVENTION

The present invention generally relates to trunk doors for vehicles, and more specifically, a trunk door having a powered hinge that applies a downward force onto a piece of cargo disposed within a trunk aperture of the vehicle.

BACKGROUND OF THE INVENTION

Various automobiles include trunks having rotationally operable trunk doors that operate to provide access to a trunk compartment of a vehicle. Certain trunks include limited cargo space, such that larger cargo items disposed within the trunk compartment may extend through a trunk aperture so that the trunk door cannot fully close. In these situations, the trunk door cannot latch and the cargo and the trunk door each need to be secured to prevent unwanted movement during operation of the vehicle.

SUMMARY OF THE INVENTION

According to one aspect of the present invention, a vehicle trunk door includes a door panel. A hinge is coupled to the door panel for rotating the door panel between a plurality of rotational positions. A motor is coupled to the hinge, wherein the motor applies a rotational force to the hinge. The rotational force biases the door panel toward a closed position. When cargo is disposed within a trunk aperture, the door panel is biased against the cargo to at least partially secure the cargo within the trunk aperture.

Embodiments of this aspect of the invention can include any one or combination of the following features:
- the motor operates to apply a consistent biasing force against the cargo
- upon shifting of the cargo to define a shifted cargo, the motor operates the door panel to maintain the consistent biasing force against the shifted cargo
- after the consistent biasing force is established, a braking mechanism maintains the rotational position of the door panel to apply the consistent biasing force
- the braking mechanism includes a caliper that applies a braking force against a portion of the hinge
- when the cargo defines the shifted cargo such that the shifted cargo is free of the consistent biasing force, the braking mechanism operates to a release position and the motor operates to reestablish the consistent biasing force.
- the braking mechanism includes a protrusion that engages at least one recess of a plurality of recesses defined within a portion of the hinge, and wherein engagement of the protrusion with the at least one recess maintains the consistent biasing force against the cargo
- the braking mechanism operates to prevent movement of the door panel toward a fully-open position, and wherein when the cargo defines the shifted cargo, the motor can be selectively operated to reestablish the consistent biasing force while the braking mechanism is engaged with the hinge
- the braking mechanism includes a one-way ratcheting mechanism, and wherein engagement of the braking mechanism defines selective operation of the door panel toward the closed position to maintain the consistent biasing force and further defines an absence of movement toward the fully-open position until the braking mechanism is disengaged
- the motor includes a gearing mechanism that meshes with a portion of the hinge
- the motor includes a piston-operated actuator
- the hinge includes an arcuate arm that slidably engages a hinge channel, and wherein the motor and the braking mechanism are disposed proximate the hinge channel to selectively engage the arcuate arm According to another aspect of the present invention, a vehicle includes a trunk door having a hinge. A motor operates the trunk door toward a closed position to define an intermediate rotational position that is distal from the closed position. A braking mechanism selectively secures the trunk door in the intermediate rotational position.

Embodiments of this aspect of the invention can include any one or combination of the following features:
- the intermediate rotational position is further defined by the trunk door engaging an obstructing cargo positioned within an aperture of the trunk door and the trunk door applying a consistent biasing force against the obstructing cargo, wherein the obstructing cargo prevents the trunk door from reaching the closed position
- when a position of the obstructing cargo within the aperture is modified, the obstructing cargo defines a shifted cargo that is free of the consistent biasing force, and wherein when the obstructing cargo defines the shifted cargo, the motor operates to define a shifted intermediate rotational position that reestablishes the consistent biasing force against the shifted cargo
- operation of the motor to operate the trunk door from the intermediate rotational position to the shifted intermediate rotational position is performed without disengaging the braking mechanism
- the motor and the braking mechanism selectively engage the hinge for the trunk door
- the braking mechanism includes an operable caliper that selectively secures the hinge in the intermediate rotational position According to another aspect of the present invention, a method for securing shifted cargo within a vehicle trunk includes operating a motor to move a trunk door into engagement with an obstruction placed within an aperture for the trunk door. A braking mechanism is activated to secure the trunk door in an intermediate rotational position, wherein the intermediate rotational position defines a consistent biasing force exerted by the trunk door against the obstruction. The consistent biasing force is maintained as the obstruction defines a shifted position, wherein the motor activates to redefine the intermediate rotational position based upon the shifted position of the obstruction. The motor and the braking mechanism are deactivated to remove the consistent biasing force and the trunk door is operated to a fully-open position.

Embodiments of this aspect of the invention can include any one or combination of the following features:
- the step of maintaining the consistent biasing force is performed while the braking mechanism is activated, wherein the braking mechanism in an active state is adapted to prevent operation of the trunk door in a direction of the fully-open position, and wherein the braking mechanism in the active state allows for operation of the motor to redefine the intermediate rotational position to be closer to a closed position These and other aspects, objects, and features of the present invention will be understood and appreciated by

DETAILED DESCRIPTION OF THE PREFERRED EMBODIMENTS

Figure 1:
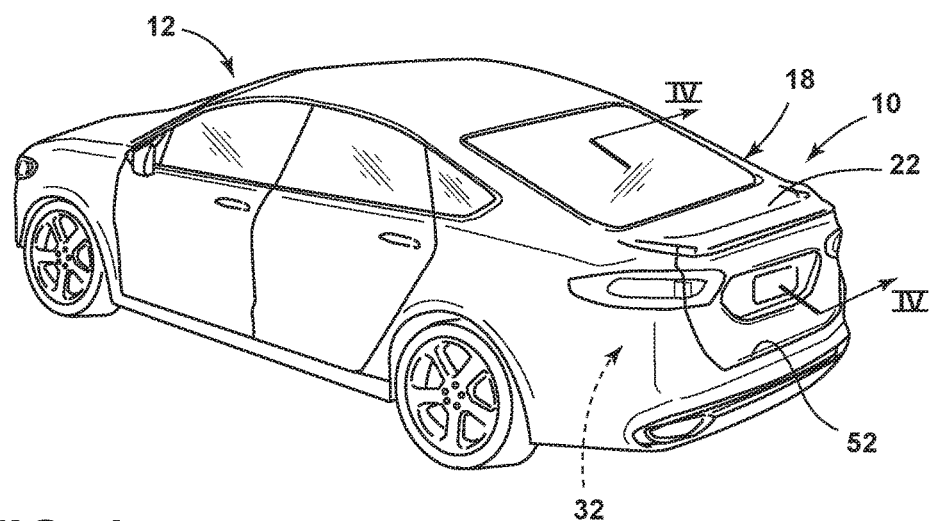
FIG. 1 is a rear perspective view of a vehicle incorporating an aspect of the powered trunk door shown in a closed position.
Figure 2:
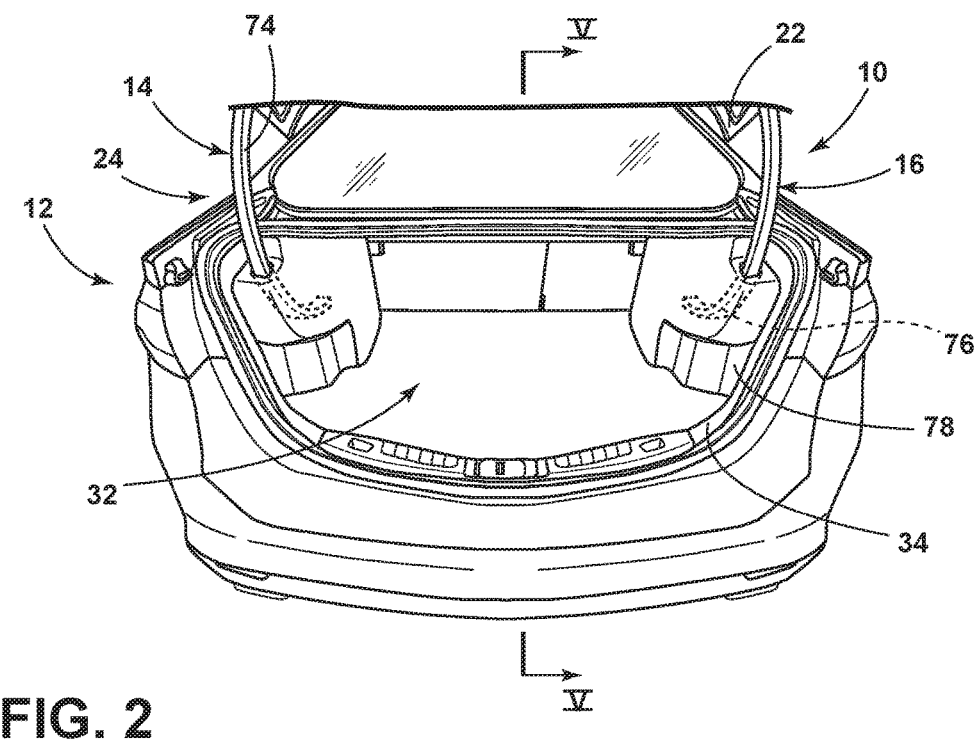
FIG. 2 is a rear elevational view of the vehicle of FIG. 1 showing the powered trunk door in a fully-open position.
Figure 3:
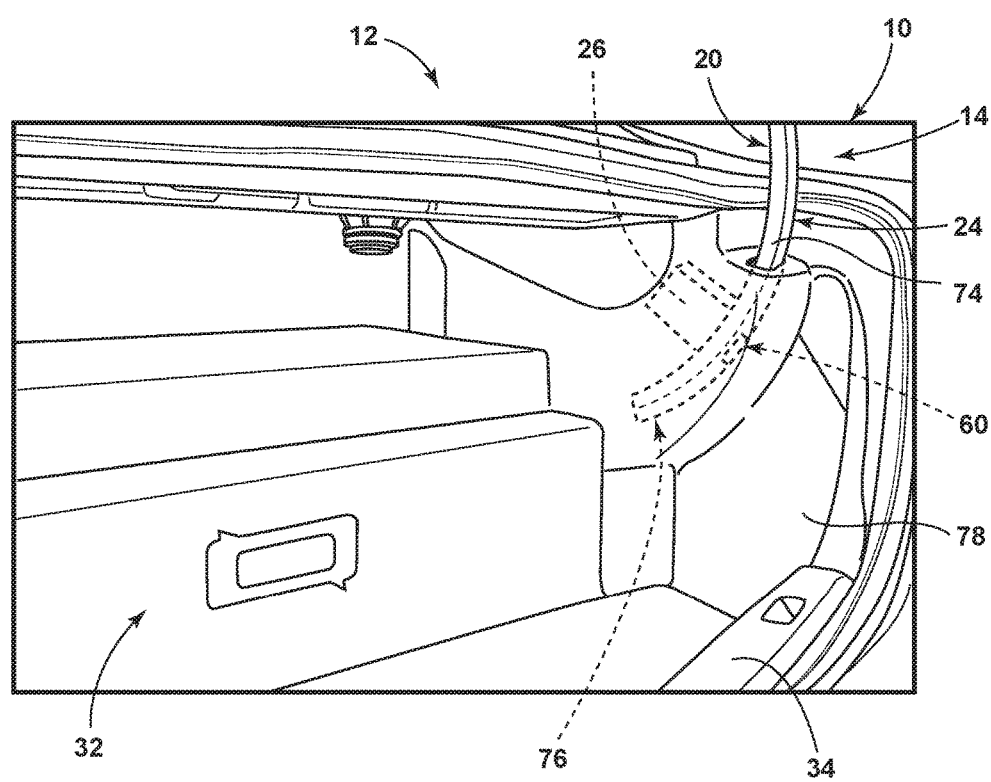
FIG. 3 is a rear perspective view of a vehicle trunk showing an aspect of the powered trunk door in a fully-open position.
Figure 4:
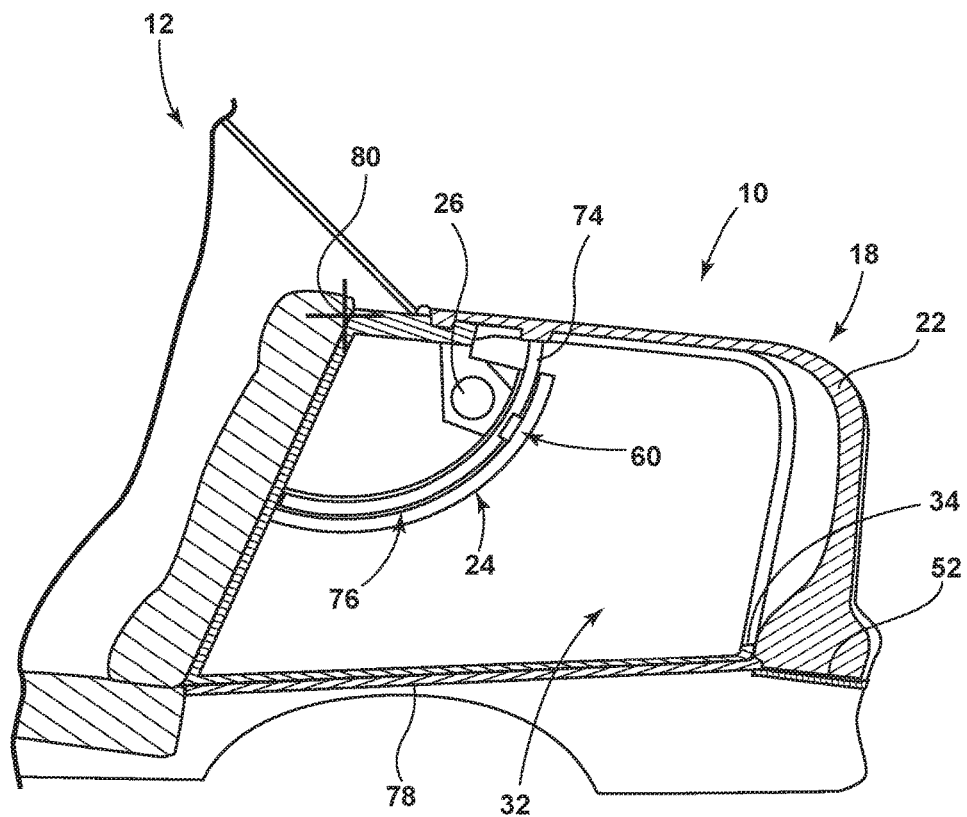
FIG. 4 is a cross-sectional view of the vehicle of FIG. 1 taken along line IV-IV.
Figure 5:
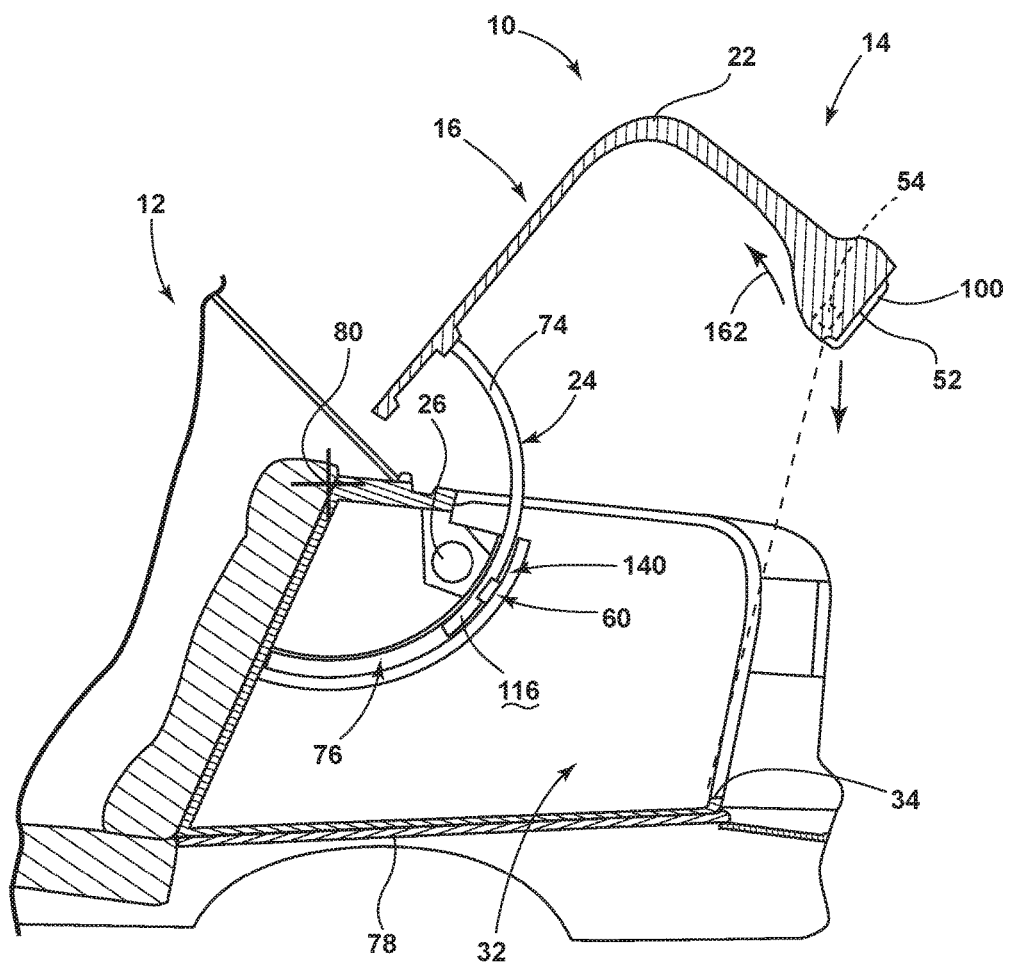
FIG. 5 is a cross-sectional view of the vehicle of FIG. 2 taken along line V-V.
Figure 6:
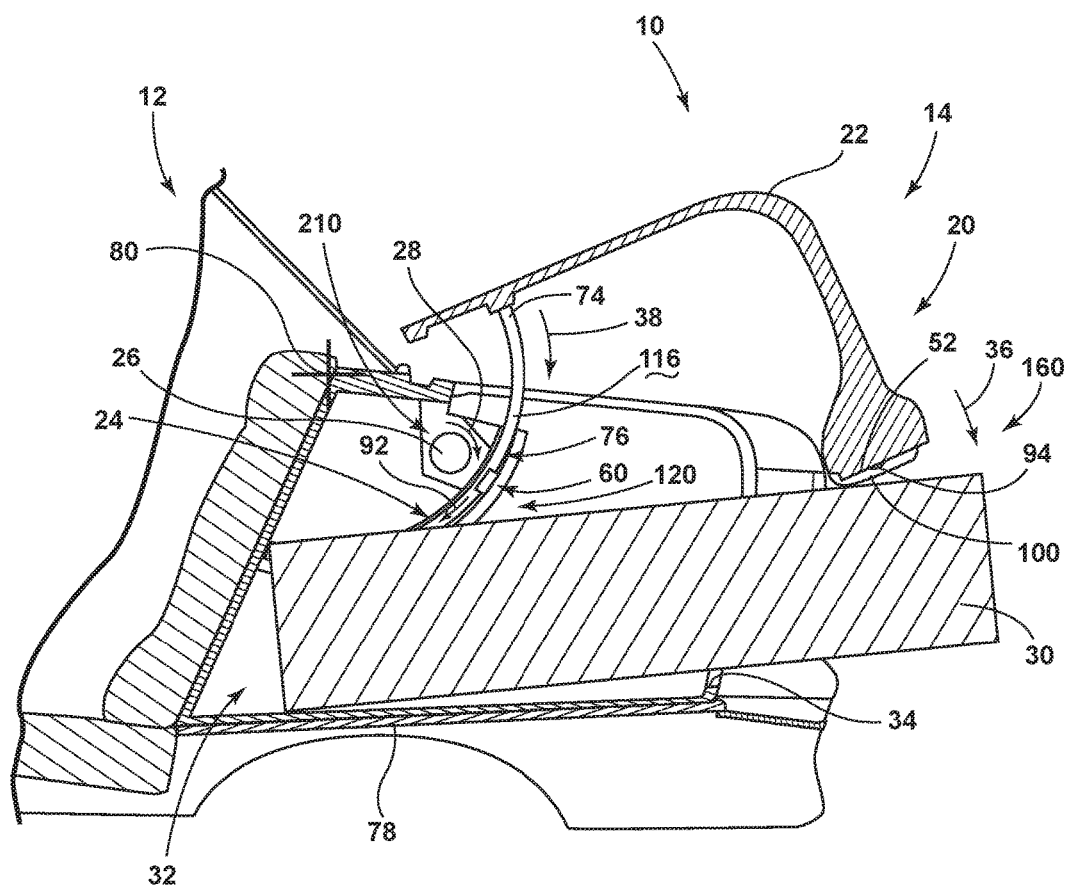
FIG. 6 is a cross-sectional view of the vehicle trunk of FIG. 4 showing the powered trunk door in a first intermediate position and engaging the cargo item within the trunk aperture.
Figure 7:
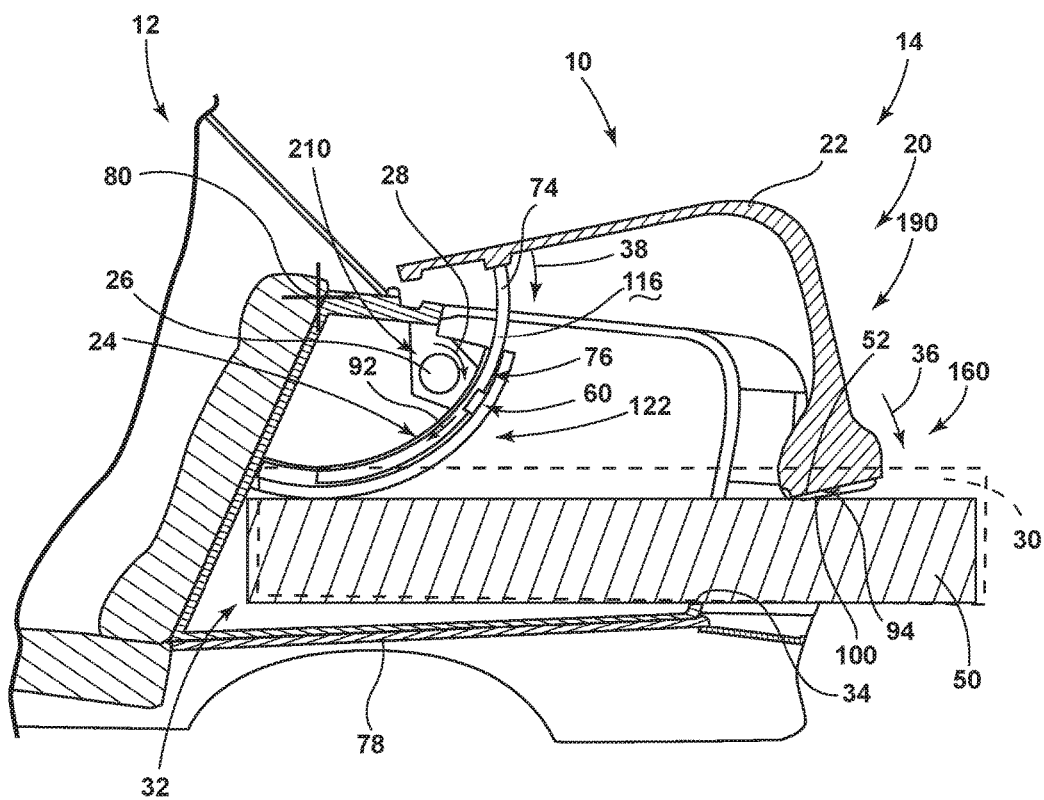
FIG. 7 is a cross-sectional view of vehicle trunk of FIG. 6 showing the powered trunk door in a second intermediate position after the cargo has shifted and the powered trunk door is readjusted to engage the shifted cargo.
Figure 8:
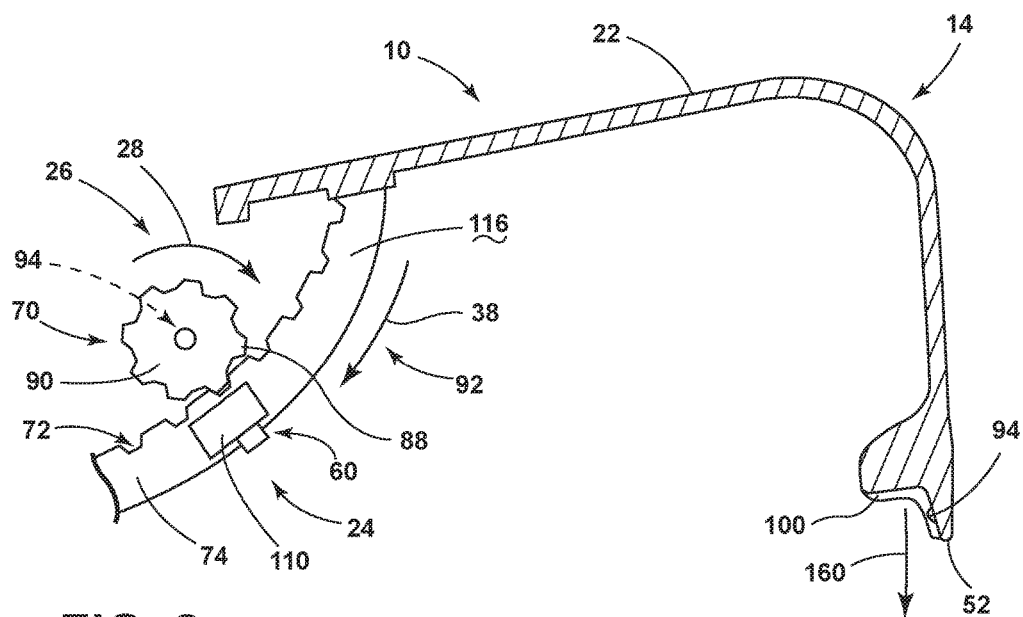
FIG. 8 is a schematic cross-sectional view of a powered trunk door incorporating an aspect of a motor and braking mechanism for adjusting the rotational position of the powered trunk door.
Figure 9:
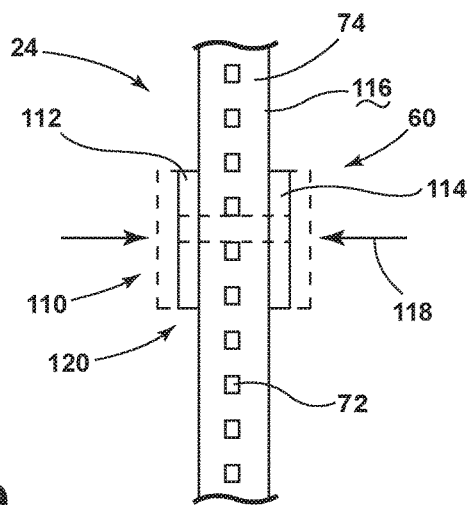
FIG. 9 is a front elevational view of an aspect of the braking mechanism for the powered trunk door.
Figure 10:
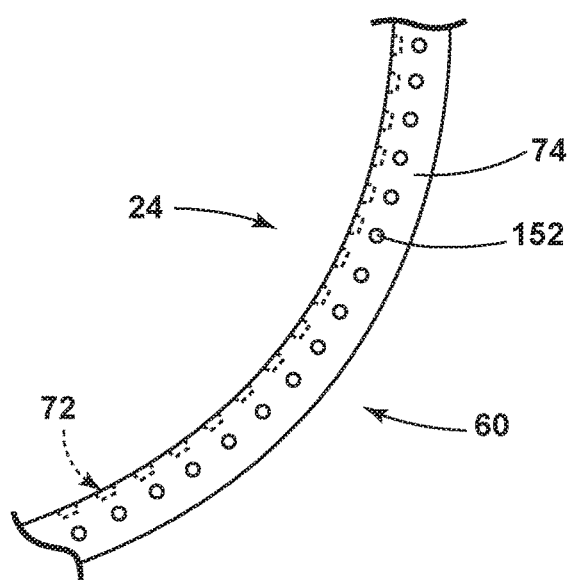
FIG. 10 is a partial side elevational view of an aspect of the hinge for the powered trunk door showing a plurality of recesses for engaging and disengaging the braking mechanism.
Figure 11:
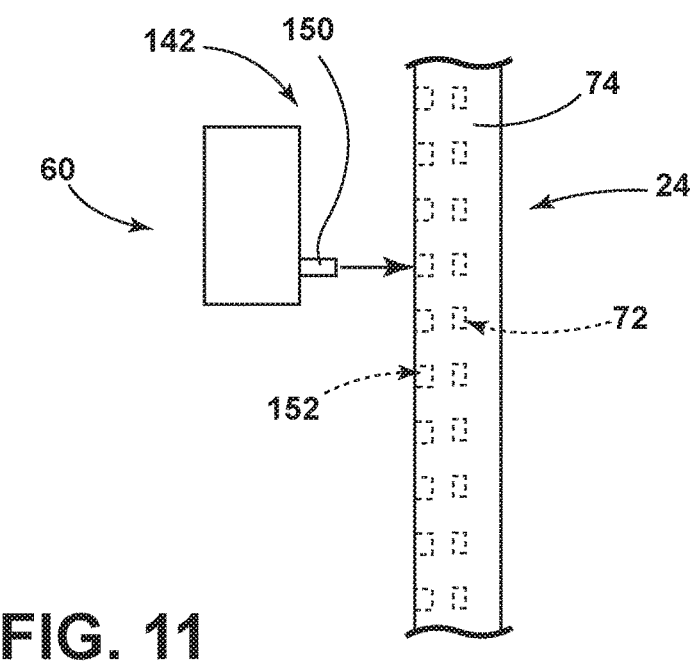
FIG. 11 is a front elevational view of the braking mechanism of FIG. 10 and showing operation of the braking mechanism in conjunction with the plurality of recesses.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-9, reference numeral 10 generally refers to a powered trunk door for a vehicle 12 that is operable between a plurality of rotational positions 14 including a fully-open position 16, a closed position 18, and a plurality of intermediate rotational positions 20. According to various embodiments of the device, the powered trunk door 10 can include a door panel 22 and a hinge 24 coupled to the door panel 22 for rotating the door panel 22 between the plurality of rotational positions 14. A motor 26 is coupled to the hinge 24. The motor 26 applies a rotational force 28 to the hinge 24. In this manner, the rotational force 28 applied by the motor 26 biases the door panel 22 toward the closed position 18. When an obstruction, such as cargo 30, luggage, equipment and other such obstructing cargo 30 are placed within the trunk 32 and disposed within a trunk aperture 34, the door panel 22 is biased against the obstructing cargo 30 to at least partially secure the obstructing cargo 30 within the trunk aperture 34. Accordingly, the motor 26 of the powered trunk door 10 operates to apply a consistent biasing force 36 against the obstructing cargo 30 disposed within the trunk aperture 34.

Referring again to FIGS. 1-9, during operation of the vehicle 12 where the obstructing cargo 30 is disposed within a trunk aperture 34, certain items of the obstructing cargo 30 may shift as a result of vibrations, bumps and other vertical and lateral movements experienced by the vehicle 12. These movements can cause the obstructing cargo 30, such as lumber, boxes, or other similar cargo 30 to shift within the trunk 32 and within the trunk aperture 34 to define a shifted cargo 50. As the cargo 30 shifts to define the shifted cargo 50, the shifted cargo 50 is typically at a lower position within the trunk 32. Accordingly, the shifted cargo 50 may become disengaged with a portion of the door panel 22 as the cargo 30 defines the shifted cargo 50. In response to this redefined position of the shifted cargo 50, the motor 26 operates the door panel 22 to maintain the consistent biasing force 36 of the door panel 22 of the powered trunk door 10 against the shifted cargo 50.

While the term "consistent biasing force 36" is used herein, the consistent biasing force 36 may also be a substantially consistent biasing force as the motion of the vehicle 12 and the cargo 30 may vary the exact pressure applied against the cargo 30.

It is also contemplated that certain cargo 30 may shift in an upward direction such that the position of the door panel 22 may cause an increased biasing force to be placed upon the shifted cargo 50. In such a condition, the motor 26 may operate in a generally upward direction to decrease the biasing force exerted on the cargo 30 to define the consistent biasing force 36 that is placed upon the cargo 30 to assist in securing the cargo 30 within the trunk aperture 34 between the trunk aperture 34 and the lower edge 52 of the powered trunk door 10.

Referring again to FIGS. 2-9, the powered trunk door 10 can also include a braking mechanism 60 that assists the motor 26 in maintaining the door panel 22 in a particular intermediate rotational position 20 of the plurality of rotational positions 14. Accordingly, once the consistent biasing force 36 is established through operation of the motor 26, the braking mechanism 60 can be engaged to selectively and temporarily secure the door panel 22 and maintain the intermediate rotational position 20 of the door panel 22 in applying the consistent biasing force 36 against the cargo 30 or the shifted cargo 50. Through the use of the powered trunk door 10, the motor 26 and braking mechanism 60 cooperate to set and selectively secure the intermediate rotational position 20 of the door panel 22 to maintain the consistent biasing force 36 downward and onto the cargo 30 disposed within the trunk aperture 34. The motor 26 can adjust the rotational position of the door panel 22 and also apply the consistent biasing force 36 against the cargo 30 or other obstruction. Once the consistent biasing force 36 is established against the cargo 30, the braking mechanism 60 engages to maintain the position of the door panel 22 and also maintain the application of the consistent biasing force 36 against the cargo 30. Once the braking mechanism 60 is engaged, the motor 26 may become disengaged or, at minimum, may be adjusted to apply less of a downward force 38 against the door panel 22 such that the motor 26 is not overexerted during operation of the powered trunk door 10.

Referring again to FIGS. 2-9, the motor 26 for the powered trunk door 10 can include a gearing mechanism 70 that meshes with the gearing recesses 72 that are defined within a portion of the hinge 24 for the powered trunk door 10. In such an embodiment, the hinge 24 for the powered trunk door 10 can include an arcuate hinge bar 74, being in the form of an arcuate arm of the hinge 24, that slidably rotates within a hinge channel 76 defined proximate a frame 78 of the vehicle 12. In such an embodiment, the arcuate hinge bar 74 slides within the hinge channel 76 such that the door panel 22 rotates about a distally located pivot point 80. Where obstructing cargo 30 is disposed within the trunk aperture 34, the motor 26 can be engaged to operate the powered trunk door 10 in a generally downward position to engage the obstructing cargo 30 and apply the consistent biasing force 36 against the obstructing cargo 30. The geared motor 26 includes a drive gear 90 with cogs 88 that engage the gearing recesses 72 of the arcuate hinge bar 74 to slidably rotate the arcuate hinge bar 74 in a generally inward direction 92 into the hinge channel 76. The operation of the drive gear 90 and the arcuate hinge bar 74 in the inward direction 92 applies a downward force 38 against the door panel 22 to move the door panel 22 toward the closed position 18. When the door panel 22 engages the obstructing cargo 30 disposed within the trunk aperture 34, various sensors 94 disposed proximate the motor 26 determine the amount of downward force 38 that is applied against the cargo 30 within the trunk aperture 34. Such sensors 94 can include, but are not limited to, torque sensors, voltage sensors, pressure sensors within the door panel 22, combinations thereof, and other similar sensors 94 that can be used to apply the consistent biasing force 36 against the obstruction.

To assist in establishing and maintaining the consistent biasing force 36, the door panel 22 can include a bumper member 100 that is positioned at a lower edge 52 of the door panel 22. In such an embodiment, the bumper member 100 serves to engage the cargo 30 and also prevents damage to the door panel 22 during operation of the powered trunk door 10. In various embodiments, the bumper member 100 of the door panel 22 can also include one or more sensors that measure the amount of downward force 38 that is exerted by the door panel 22 against the cargo 30. The sensors 94, such as pressure sensors, can determine whether the consistent biasing force 36 has been achieved.

Referring again to FIGS. 4-9, the powered trunk door 10 can also include the braking mechanism 60, where the braking mechanism 60 may include a braking caliper 110 having opposing first and second pads 112, 114 that engage opposing braking surfaces 116 of the hinge bar 74. When the braking mechanism 60 is engaged, the first and second pads 112, 114 of the calipers 110 operate toward one another to engage the hinge bar 74 and apply a braking force 118 to the hinge bar 74 to prevent operation of the hinge bar 74 out of a secured position 120. The braking mechanism 60 can be disengaged when the powered trunk door 10 is disengaged to remove the cargo 30, or when the cargo 30 defines a shifted cargo 50. When the cargo 30 defines a shifted cargo 50, the consistent biasing force 36 may no longer be applied to the cargo 30 and the motor 26 can be reengaged to adjust the intermediate rotational position 20 of the door panel 22 to reestablish the consistent biasing force 36. Once the consistent biasing force 36 is reestablished, the braking mechanism 60 can be reengaged to define a new secured position 122 of the door panel 22 and into the shifted intermediate rotational position 190.

Figure 12:
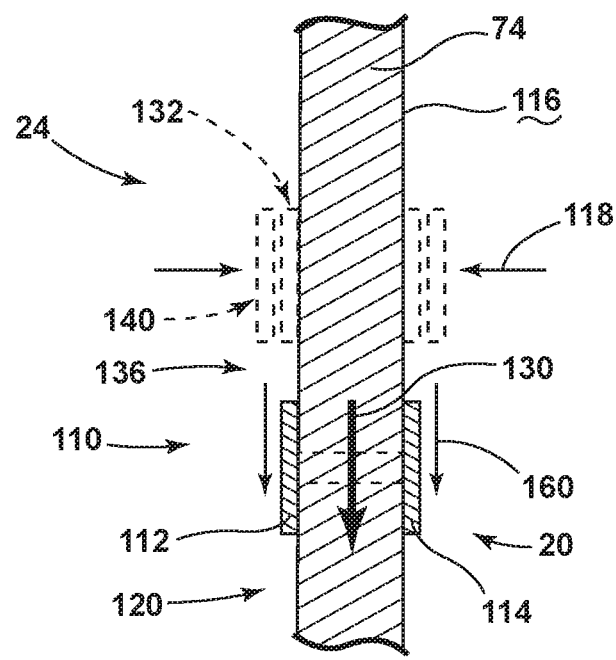
FIG. 12 is a schematic diagram illustrating operation of an aspect of the braking mechanism for the powered trunk door.
Figure 13:
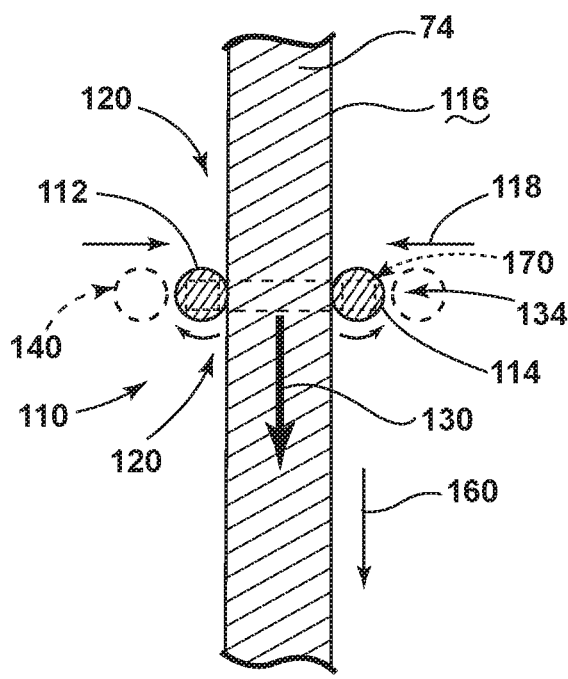
FIG. 13 is a schematic diagram illustrating operation of an aspect of the braking mechanism for the powered trunk door.
Figure 14:
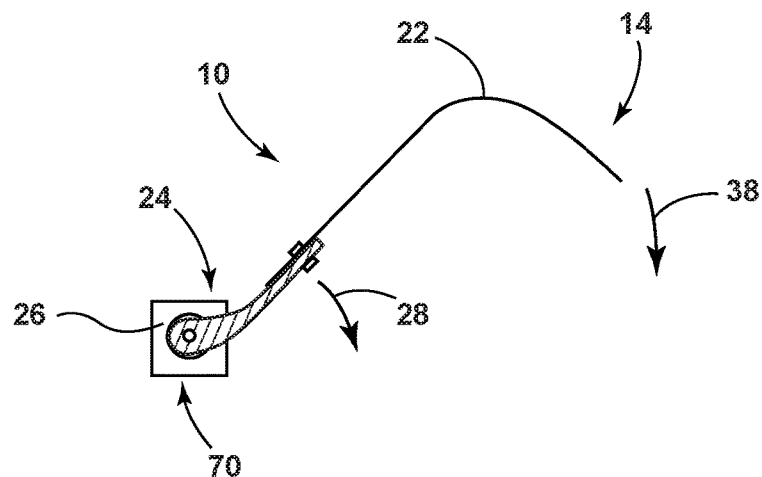
FIG. 14 is a schematic illustration of the powered trunk door incorporating an electric motor and a pivoting actuator.
Figure 15:
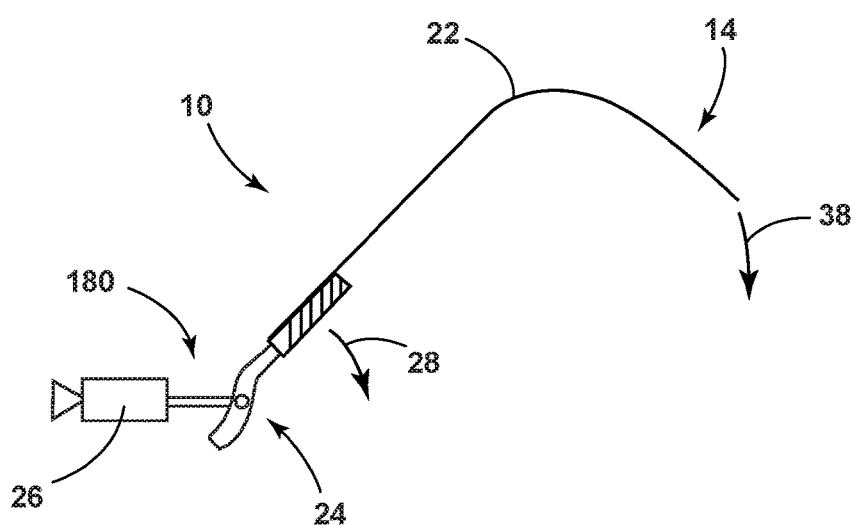
FIG. 15 is a schematic diagram illustrating an aspect of the powered trunk door incorporating a hydraulic piston for moving the powered trunk door between the plurality of rotational positions.

According to various aspects of the device as exemplified in FIGS. 12 and 13, the braking mechanism 60 can include an operable set of calipers 110 that applies the braking force 118 and also applies a generally downward biasing force 130 against the hinge bar 74. In such an embodiment, as the braking mechanism 60 engages, the braking force 118 is applied to the secured position 120 such that the hinge bar 74 is secured with respect to the braking mechanism 60. The braking mechanism 60 can then apply the downward biasing force 130 to move the door panel 22 into the appropriate position to apply the consistent biasing force 36. In such an embodiment, the motor 26 is adapted to operate the hinge bar 74 a particular distance to define a ready position 132 such that the door panel 22 engages the cargo 30 but does not supply enough force to define the consistent biasing force 36. Once the motor 26 places the door panel 22 in this ready position 132 that is distal from the desired intermediate rotational position 20, the braking mechanism 60 engages and applies first the braking force 118 to define the secured position 120, and then the downward biasing force 130 to move the door panel 22 from the ready position 132 and into the intermediate rotational position 20 to define the consistent biasing force 36. In this embodiment, the braking mechanism 60 can include a secondary motor 26 that includes a cam, and/or a linear actuator 136 that can move and secure the door panel 22 in the intermediate rotational position 20 and hold the door panel 22 in this position for an extended period of time. In various aspects of the device, as the calipers 110 engage the hinge bar 74, inward compression of the first and second pads 112, 114 in applying the braking force 118 utilizes the rotating pads 134, such as a wheel or cam, to apply a simultaneous downward biasing force 130, such that as the calipers 110 move inward, the rotating pads 134 controls the path of the calipers 110 to move inward and simultaneously downward to apply both the braking force 118 and the downward biasing force 130. The calipers 110 may be operated through a cam, a hydraulic mechanism, a screw drive, scissor drive, servo motor, piston mechanism, combinations thereof and other similar operating mechanisms that can apply a high torque force and also maintain a particular force for an extended period of time.

According to various aspects of the device, the braking mechanism 60 may include an additional motor 26 for operating a mechanical lock 142 that physically engages the hinge bar 74 and/or other portions of the powered trunk door 10. In this manner, the motor 26 and, potentially, the motors can cooperate to apply the consistent biasing force 36. Once in this position, the mechanical lock 142 of the braking mechanism 60 can engage the hinge bar 74 such that no motors 26 are used to maintain the position of the hinge bar 74 and the door panel 22 in the intermediate rotational position 20 to provide the consistent biasing force 36.

Referring again to FIGS. 1-11, during operation of the vehicle 12, as the obstructing cargo 30 is disposed within the trunk aperture 34, the cargo 30 may define the shifted cargo 50, such that the shifted cargo 50 moves away from the lower edge 52 of the door panel 22 and is free of the consistent biasing force 36. In such a situation, the braking mechanism 60 may operate to a release position 140 and the motor 26 operates to reestablish the consistent biasing force 36. In this manner, when the braking mechanism 60 defines the release position 140, the motor 26 reengages to move the door panel 22 to an appropriate position in engagement with the cargo 30 and to reestablish the consistent biasing force 36.

Referring again to FIGS. 4-11, the braking mechanism 60 can include a mechanical lock 142 in the form of a protrusion 150 that engages at least one recess 152 of a plurality of recesses 152 defined within a portion of the hinge bar 74. In this manner, engagement of the protrusion 150 with the at least one recess 152 maintains the intermediate rotational position 20 of the door panel 22 and also the consistent biasing force 36 against the cargo 30.

According to various aspects of the device, the braking mechanism 60 is adapted to prevent movement of the door panel 22 toward the fully-open position 16. In certain embodiments, the braking mechanism 60 may be a one-way braking mechanism that allows for downward movement 160 of the door panel 22, but simultaneously prevents upward movement 162 of the door panel 22 toward the fully-open position 16. In such an embodiment, when the cargo 30 defines the shifted cargo 50, the shifted cargo 50 may be lower in height than the original cargo position. When the shifted cargo 50 is lower, the consistent biasing force 36 may be no longer present. Through the use of the one-way braking mechanism 170, the motor 26 can reengage and move the door panel 22 toward the closed position 18 and reestablish the consistent biasing force 36 while the braking mechanism 60 is still engaged with the hinge bar 74. In such an embodiment, it is contemplated that the caliper 110 for the braking mechanism 60 can be substantially arcuate in shape, such as in the form of a cam or wheel as exemplified in FIG. 13. In this embodiment, the cam or wheel may be able to rotate in a single direction to allow downward movement 160 of the hinge bar 74 and, in turn, downward movement 160 of the door panel 22 toward the closed position 18 to reengage the cargo 30 and reestablish the consistent biasing force 36. Such a one-way braking mechanism 170 may be in the form of a one-way ratcheting mechanism such that the braking mechanism 60 defines selective operation of the door panel 22 toward a closed position 18. This selective operation of the door panel 22 can be in the form of only downward movement 160. The one-way braking mechanism 170 of the braking mechanism 60 selectively prevents upward movement 162 of the door panel 22 and also allows for the operation of the motor 26 to move the door panel 22 to reestablish the consistent biasing force 36. In this manner, the one-way braking mechanism 170 further defines an absence of movement toward the fully-open position 16 until the braking mechanism 60 is disengaged to the release position 140.

Referring now to FIGS. 4-15, the motor 26 can include a gearing mechanism 70 that meshes with a portion of the hinge 24. In various aspects of the device, the motor 26 can include a piston-operated actuator 180. In certain aspects of the device, a combination of operating mechanisms can be used to manipulate the hinge bar 74 to define the plurality of rotational positions 14 of the door panel 22.

It is contemplated that the hinge 24 of the powered trunk door 10 can include a hinge arm that is operated by the motor 26 and the braking mechanism 60. According to various aspects of the device, the hinge 24 of the powered trunk door 10 can also include other types of hinges 24 and hinge mechanisms that may be found in conventional trunk doors.

Referring again to FIGS. 1-17, the vehicle 12 can include the powered trunk door 10 having the hinge 24. The motor 26 serves to operate the powered trunk door 10 toward a closed position 18 to define the intermediate rotational position 20 that is distal from the closed position 18 of the powered trunk door 10. A braking mechanism 60 is included that selectively secures the powered trunk door 10 in the intermediate rotational position 20. As discussed previously, the intermediate rotational position 20 is a desired position that engages the cargo 30 and defines the consistent biasing force 36 that is exerted against the obstructing cargo 30 to assist in securing the cargo 30 within the trunk aperture 34. Accordingly, the intermediate rotational position 20 is further defined by the powered trunk door 10 in engaging an obstructing cargo 30 positioned within the trunk aperture 34 of the powered trunk door 10 and the powered trunk door 10 applying the consistent biasing force 36 against the obstruction. In this manner, the obstructing cargo 30 prevents the powered trunk door 10 from reaching the closed position 18. The motor 26 and braking mechanism 60 of the powered trunk door 10 cooperate to prevent generally upward movement 162 of the cargo 30 within the trunk aperture 34.

As exemplified in FIGS. 4-11, when the position of the obstructing cargo 30 within the aperture is modified, the cargo 30 defines a shifted cargo 50 that is free of a consistent biasing force 36. When the cargo 30 defines this shifted cargo 50 or shifted obstruction, the motor 26 operates or is reengaged to define a shifted intermediate rotational position 190 of the powered trunk door 10 that reestablishes the consistent biasing force 36 against the shifted cargo 50. This movement of the powered trunk door 10 from the intermediate rotational position 20 to the shifted intermediate rotational position 190 may be performed without operating the braking mechanism 60 to the release position 140. Such an embodiment may be possible where the braking mechanism 60 includes a one-way braking mechanism 170 such as the one-way ratcheting mechanism as disclosed herein.

Figure 16:
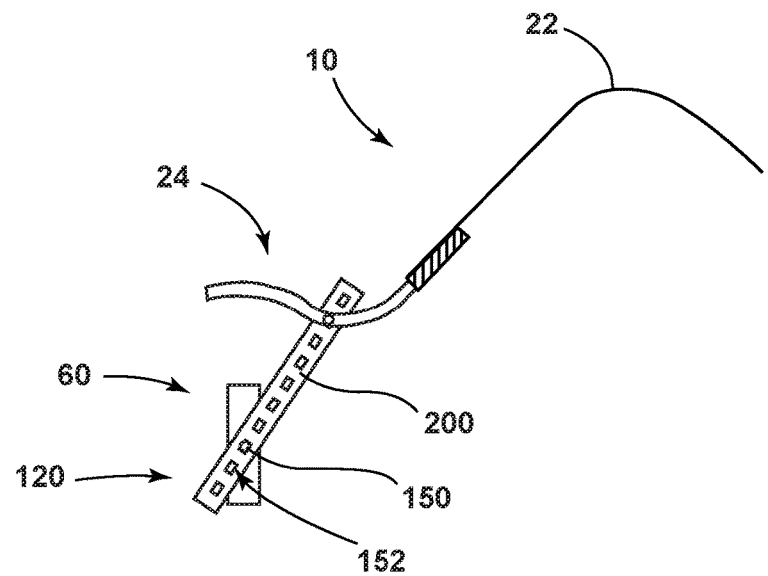
FIG. 16 is a schematic illustration of a braking mechanism for the powered trunk door illustrating a slotted rail having a plurality of recesses and incorporating an actuator pin that engages the recesses and sets the position of the powered trunk door.
Figure 17:
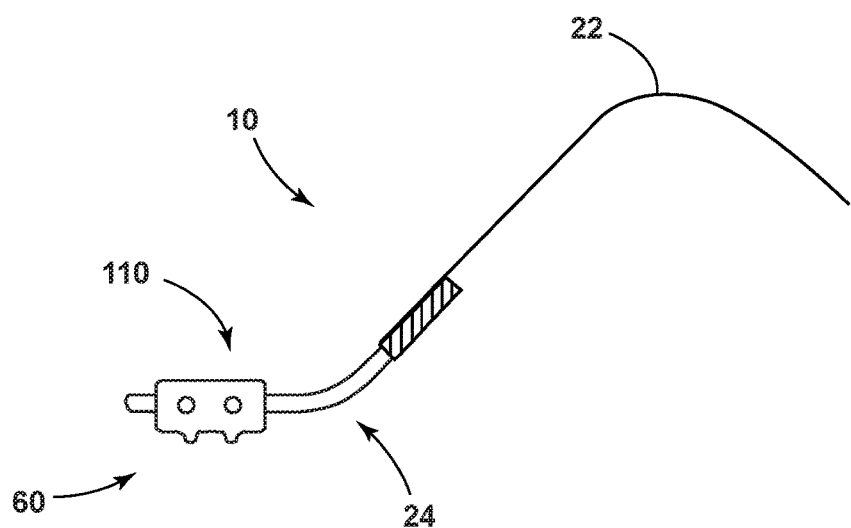
FIG. 17 is a schematic diagram illustrating an aspect of the braking mechanism incorporating a caliper that engages a portion of the hinge for the powered trunk door to set the position of the powered trunk door in one of the plurality of rotational positions.
Figure 18:
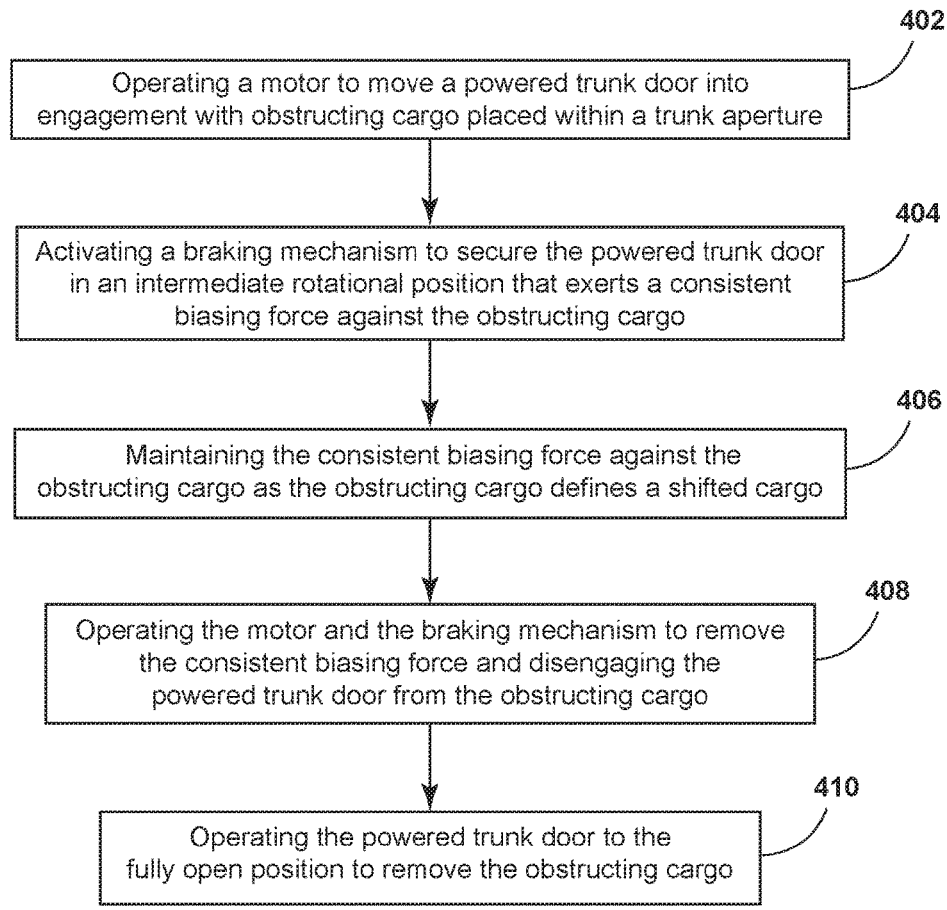
FIG. 18 is a schematic flow diagram illustrating a method for securing the shifted cargo within the vehicle trunk.

Referring now to FIGS. 16 and 17, the braking mechanism 60 can include a mechanism that selectively engages the hinge 24 for the powered trunk door 10. In various aspects of the device, the braking mechanism 60 can include an operable caliper 110 that selectively secures the hinge 24 in the intermediate rotational position 20. As discussed previously, the braking mechanism 60 may be used in conjunction with the motor 26 to apply the consistent biasing force 36 by applying an at least partial rotation to the powered trunk door 10 for achieving consistent biasing force 36. The braking mechanism 60 can include calipers 110 and can also include a slotted rail 200 that uses an actuating pin that engages the slot rail for securing the position of the powered trunk door 10.

Referring now to FIGS. 1-18, having described various aspects of the powered trunk door 10, a method 400 is disclosed for securing a shifted cargo 50 within a vehicle trunk 32. According to the method 400, cargo 30 can be placed within a trunk 32 and at least partially occupied within a trunk aperture 34. Once located therein, a motor 26 can be operated to move the powered trunk door 10 into engagement with the obstructing cargo 30 placed within the trunk aperture 34 for the powered trunk door 10 (step 402). Once the powered trunk door 10 engages the cargo 30, a braking mechanism 60 can be activated to secure the powered trunk door 10 in an intermediate rotational position 20 (step 404). As discussed above, the intermediate rotational position 20 defines a consistent biasing force 36 that is exerted by the powered trunk door 10 against the cargo 30. The consistent biasing force 36 can be achieved through operation of the motor 26 by itself or can be achieved through simultaneous operation of the motor 26 and activating the braking mechanism 60. Alternatively, the consistent biasing force 36 may be achieved by the motor 26 moving the powered trunk door 10 to a certain position and, subsequently, the braking mechanism 60 can be activated to secure the braking mechanism 60 against the hinge bar 74 and also rotationally operate the door panel 22 into the intermediate rotational position 20. The consistent biasing force 36 is then maintained as the cargo 30 defines a position of the shifted cargo 50 (step 406).

Referring again to FIGS. 1-18, when the obstructing cargo 30 defines the position of the shifted cargo 50, the motor 26 and/or the braking mechanism 60 activates to redefine the intermediate rotational position 20 based upon the position of the shifted cargo 50. The new position of the shifted cargo 50 may be at a position lower than the original position of the cargo 30. Accordingly, the consistent biasing force 36 may be temporarily removed and the motor 26 and/or the braking mechanism 60 are activated and operated to move the door panel 22 back into engagement with the shifted cargo 50 to redefine the consistent biasing force 36 against the shifted cargo 50. When the consistent biasing force 36 is no longer needed and the cargo 30 or the shifted cargo 50 is to be removed, the motor 26 and the braking mechanism 60 can be deactivated to remove the consistent biasing force 36 (step 408). After deactivating the braking mechanism, the powered trunk door 10 can be operated to the fully-open position 16 and the cargo 30 can be removed (step 410).

It is contemplated that the motor 26 and the braking mechanism 60 may be activated only when the consistent biasing force 36 is needed. Where no obstructing cargo 30 is present within the trunk aperture 34 of the powered trunk door 10, the motor 26 and the braking mechanism 60 may remain idle and a separate operating mechanism may be used for serving as a door closer for the powered trunk door 10 or door operating mechanism for the powered trunk door 10. It is also contemplated that the motor 26 for the powered trunk door 10 may also serve as the motor 26 for operating the powered trunk door 10 whether an obstruction is present in the aperture or not.

It is contemplated that the step 406 of maintaining the consistent biasing force 36 may be performed while the braking mechanism 60 is activated. When the braking mechanism 60 is in an active state 210 and engaging the hinge bar 74, the braking mechanism 60 can be adapted to prevent operation of the powered trunk door 10 in the direction of the fully-open position 16. In such an embodiment, it is contemplated that the braking mechanism 60 in the active state 210 simultaneously allows for operation of the motor 26 to move the door panel 22 toward the closed position 18 to redefine the intermediate rotational position 20 to be closer to the closed position 18 in order to reengage the cargo 30 and reestablish the consistent biasing force 36.

According to various aspects of the device, it is contemplated that the powered trunk door 10 can include a motor 26 that is disposed proximate the hinge 24 of the powered trunk door 10. The motor 26 can also be disposed proximate a lower edge 52 of the powered trunk door 10 such that the motor 26 can operate a belt-type mechanism 54 (shown in dashed line in FIG. 3) that engages with the trunk aperture 34. In such an embodiment, the motor 26 can operate the belt-type mechanism 54 to move the powered trunk door 10 in a generally downward movement 160 in order to apply the consistent biasing force 36.

According to various aspects of the device, the motor 26 and braking mechanism 60 can be used within various doors of a vehicle 12. Such doors can include, but are not limited to, trunk doors, rear hatches, cargo doors, and other similar cargo-access doors for various vehicles 12.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle trunk door comprising:
 a door panel;
 a hinge coupled to the door panel for rotating the door panel between a plurality of rotational positions;
 a motor coupled to the hinge, wherein the motor applies a rotational force to the hinge, wherein the rotational force biases the door panel toward a closed position; and
 wherein when cargo is disposed within a trunk aperture, the door panel is biased against the cargo to at least partially secure the cargo within the trunk aperture.

2. The vehicle trunk door of claim 1, wherein the motor operates to apply a consistent biasing force against the cargo.

3. The vehicle trunk door of claim 2, wherein upon shifting of the cargo to define a shifted cargo, the motor operates the door panel to maintain the consistent biasing force against the shifted cargo.

4. The vehicle trunk door of claim 3, wherein after the consistent biasing force is established, a braking mechanism maintains the rotational position of the door panel to apply the consistent biasing force.

5. The vehicle trunk door of claim 4, wherein the braking mechanism includes a caliper that applies a braking force against a portion of the hinge.

6. The vehicle trunk door of claim 4, wherein when the cargo defines the shifted cargo such that the shifted cargo is free of the consistent biasing force, the braking mechanism operates to a release position and the motor operates to reestablish the consistent biasing force.

7. The vehicle trunk door of claim 4, wherein the braking mechanism includes a protrusion that engages at least one recess of a plurality of recesses defined within a portion of the hinge, and wherein engagement of the protrusion with the at least one recess maintains the consistent biasing force against the cargo.

8. The vehicle trunk door of claim 4, wherein the braking mechanism operates to prevent movement of the door panel toward a fully-open position, and wherein when the cargo defines the shifted cargo, the motor can be selectively operated to reestablish the consistent biasing force while the braking mechanism is engaged with the hinge.

9. The vehicle trunk door of claim 8, wherein the braking mechanism includes a one-way ratcheting mechanism, and wherein engagement of the braking mechanism defines selective operation of the door panel toward the closed position to maintain the consistent biasing force and further defines an absence of movement toward the fully-open position until the braking mechanism is disengaged.

10. The vehicle trunk door of claim 1, wherein the motor includes a gearing mechanism that meshes with a portion of the hinge.

11. The vehicle trunk door of claim 1, wherein the motor includes a piston-operated actuator.

12. The vehicle trunk door of claim 4, wherein the hinge includes an arcuate arm that slidably engages a hinge channel, and wherein the motor and the braking mechanism are disposed proximate the hinge channel to selectively engage the arcuate arm.

13. A vehicle comprising:
  a trunk door having a hinge;
  a motor that operates the trunk door toward a closed position to define an intermediate rotational position that is distal from the closed position; and
  a braking mechanism that selectively secures the trunk door in the intermediate rotational position.

14. The vehicle of claim 13, wherein the intermediate rotational position is further defined by the trunk door engaging an obstructing cargo positioned within an aperture of the trunk door and the trunk door applying a consistent biasing force against the obstructing cargo, wherein the obstructing cargo prevents the trunk door from reaching the closed position.

15. The vehicle of claim 14, wherein when a position of the obstructing cargo within the aperture is modified, the obstructing cargo defines a shifted cargo that is free of the consistent biasing force, and wherein when the obstructing cargo defines the shifted cargo, the motor operates to define a shifted intermediate rotational position that reestablishes the consistent biasing force against the shifted cargo.

16. The vehicle of claim 15, wherein operation of the motor to operate the trunk door from the intermediate rotational position to the shifted intermediate rotational position is performed without disengaging the braking mechanism.

17. The vehicle of claim 13, wherein the motor and the braking mechanism selectively engage the hinge for the trunk door.

18. The vehicle of claim 13, wherein the braking mechanism includes an operable caliper that selectively secures the hinge in the intermediate rotational position.

19. A method for securing shifted cargo with in a vehicle trunk, the method comprising steps of:
  operating a motor to move a trunk door into engagement with an obstructing cargo placed within an aperture for the trunk door;
  activating a braking mechanism to secure the trunk door in an intermediate rotational position, wherein the intermediate rotational position defines a consistent biasing force exerted by the trunk door against the obstructing cargo;
  maintaining the consistent biasing force as the obstructing cargo defines a shifted position, wherein the motor activates to redefine the intermediate rotational position based upon the shifted position of the obstructing cargo;
  deactivating the motor and the braking mechanism to remove the consistent biasing force; and
  operating the trunk door to a fully-open position.

20. The method of claim 19, wherein the step of maintaining the consistent biasing force is performed while the braking mechanism is activated, wherein the braking mechanism in an active state is adapted to prevent operation of the trunk door in a direction of the fully-open position, and wherein the braking mechanism in the active state allows for operation of the motor to redefine the intermediate rotational position to be closer to a closed position.

* * * * *